United States Patent
Rhode et al.

(10) Patent No.: US 6,496,758 B2
(45) Date of Patent: Dec. 17, 2002

(54) ROLLOVER STABILITY CONTROL FOR AN AUTOMOTIVE VEHICLE USING FRONT WHEEL ACTUATORS

(75) Inventors: Douglas Scott Rhode, Farmington Hills, MI (US); Joseph Carr Meyers, Farmington Hills, MI (US); Todd Allen Brown, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,975

(22) Filed: Nov. 5, 2001

(65) Prior Publication Data

US 2002/0095244 A1 Jul. 18, 2002

Related U.S. Application Data

(63) Continuation-in-part of application No. 09/468,234, filed on Dec. 21, 1999, now Pat. No. 6,263,261.

(51) Int. Cl.$^7$ ................................................. G05D 1/00
(52) U.S. Cl. .............................. 701/1; 701/38; 701/41; 701/72
(58) Field of Search ............................... 701/1, 72, 78, 701/83, 42, 38, 41; 180/197, 282; 303/146, 166, 189; 340/429, 440

(56) References Cited

U.S. PATENT DOCUMENTS

| | | |
|---|---|---|
| 2,917,126 A | 12/1959 | Phillips |
| 3,608,925 A | 9/1971 | Murphy |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,809,183 A | 2/1989 | Eckert |
| 4,898,431 A | 2/1990 | Karnopp et al. |
| 4,964,679 A | 10/1990 | Rath |
| 4,976,330 A | 12/1990 | Matsumoto |
| 4,998,593 A | 3/1991 | Karnopp et al. |

(List continued on next page.)

FOREIGN PATENT DOCUMENTS

| | | |
|---|---|---|
| DE | 36 16 907 | 11/1987 |
| DE | 38 15 938 | 11/1989 |
| DE | 43 21 571 | 1/1994 |

(List continued on next page.)

OTHER PUBLICATIONS

A Method For Reducing On–Road Rollovers—Anti–Rollover Braking, Thomas J. Wielenga, Dynamotive, L.L.C., International Congress and Exposition, Detroit, Michigan, Mar. 1–4, 1999.

*Primary Examiner*—Richard M. Camby
(74) *Attorney, Agent, or Firm*—Gregory P. Brown

(57) ABSTRACT

A stability control system (24) for an automotive vehicle as includes a plurality of sensors (28–39) sensing the dynamic conditions of the vehicle and a controller controls a steering force to reduce a tire moment so the net moment of the vehicle is counter to the roll direction. The sensors may include a speed sensor (30), a lateral acceleration sensor (32), a roll rate sensor (34), a yaw rate sensor (20) and a longitudinal acceleration sensor (36). The controller (26) is coupled to the speed sensor (30), the lateral acceleration sensor (32), the roll rate sensor (34), the yaw rate sensor (28) and a longitudinal acceleration sensor (36). The controller (26) determines a roll angle estimate in response to lateral acceleration, longitudinal acceleration, roll rate, vehicle speed, and yaw rate. The controller (26) changes a tire force vector using by changing the direction and/or force of the steering actuator in response to the relative roll angle estimate.

8 Claims, 4 Drawing Sheets

U.S. PATENT DOCUMENTS

| | | |
|---|---|---|
| 5,089,967 A | 2/1992 | Haseda et al. |
| 5,224,765 A | 7/1993 | Matsuda |
| 5,335,176 A | 8/1994 | Nakamura |
| 5,408,411 A | 4/1995 | Nakamura et al. |
| 5,446,658 A | 8/1995 | Pastor et al. |
| 5,610,575 A | 3/1997 | Gioutsos |
| 5,634,698 A | 6/1997 | Cao et al. |
| 5,640,324 A | 6/1997 | Inagaki |
| 5,671,982 A | 9/1997 | Wanke |
| 5,707,117 A | 1/1998 | Hu et al. |
| 5,707,120 A | 1/1998 | Monzaki et al. |
| 5,732,378 A | 3/1998 | Eckert et al. |
| 5,732,379 A | 3/1998 | Eckert et al. |
| 5,737,224 A | 4/1998 | Jeenicke et al. |
| 5,742,918 A | 4/1998 | Ashrafi et al. |
| 5,762,406 A | 6/1998 | Yasui et al. |
| 5,782,543 A | 7/1998 | Monzaki et al. |
| 5,809,434 A | 9/1998 | Ashrafi et al. |
| 5,825,284 A | 10/1998 | Dunwoody et al. |
| 5,857,535 A | 1/1999 | Brooks |
| 5,869,943 A | 2/1999 | Nakashima et al. |
| 5,890,084 A | 3/1999 | Halasz et al. |
| 5,893,896 A | 4/1999 | Imamura et al. |
| 5,931,546 A | 8/1999 | Nakashima et al. |
| 6,002,974 A | 12/1999 | Schiffman |
| 6,002,975 A | 12/1999 | Schiffman et al. |
| 6,038,495 A | 3/2000 | Schiffman |
| 6,050,360 A * | 4/2000 | Pattok et al. .................. 701/41 |
| 6,065,558 A | 5/2000 | Wielenga |
| 6,178,375 B1 * | 1/2001 | Breaing ........................ 701/72 |
| 6,324,446 B1 * | 11/2001 | Brown et al. .................. 701/38 |
| 6,438,464 B1 * | 8/2002 | Wogwod et al. ............... 701/1 |

FOREIGN PATENT DOCUMENTS

| | | |
|---|---|---|
| DE | 42 27 886 | 2/1994 |
| DE | 42 28 893 | 3/1994 |
| DE | 43 35 979 | 4/1995 |
| DE | 196 02 879 | 8/1997 |
| DE | 197 51 867 | 5/1999 |
| DE | 197 51 891 | 5/1999 |
| DE | 197 51 925 | 5/1999 |
| DE | 197 51 935 | 5/1999 |
| DE | 198 02 041 | 7/1999 |
| DE | 199 07 633 | 10/1999 |
| DE | 197 51 839 | 5/2000 |
| EP | 0758601 | 2/1997 |
| FR | 24 25 342 | 12/1979 |
| GB | 2257403 | 1/1993 |
| GB | 2316455 | 2/1998 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6312612 | 11/1994 |
| JP | 8080825 | 3/1996 |
| JP | 9005352 | 1/1997 |
| JP | 10024819 | 1/1998 |
| JP | 10278762 | 10/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| SU | 816849 | 3/1981 |
| WO | WO 99/30942 | 6/1999 |

* cited by examiner

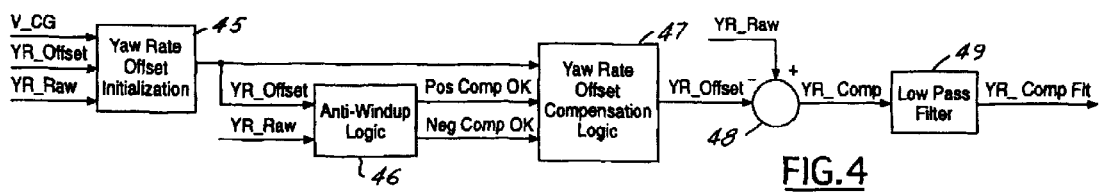
FIG. 4
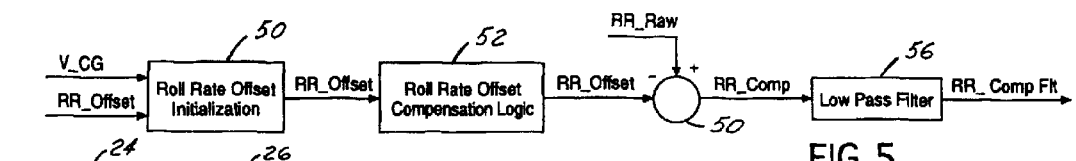
FIG. 5
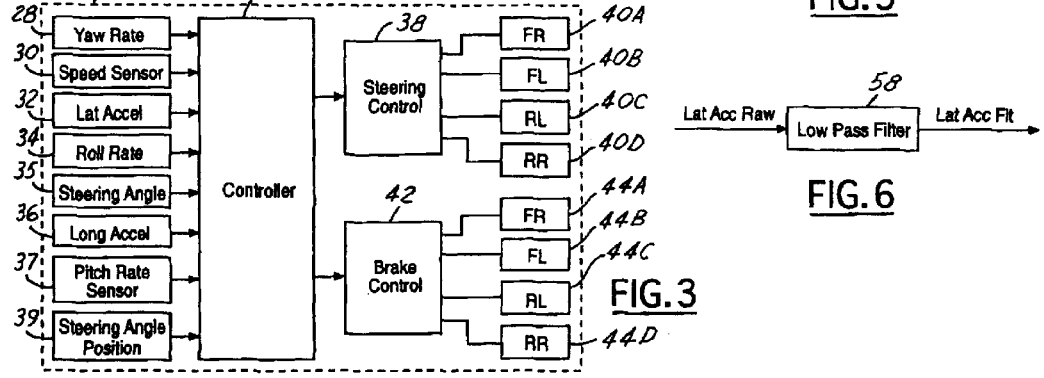
FIG. 3
FIG. 6

ROLLOVER STABILITY CONTROL FOR AN AUTOMOTIVE VEHICLE USING FRONT WHEEL ACTUATORS

CROSS REFERENCE TO RELATED APPLICATIONS

The present application is a continuation in part of U.S. patent application Ser. No. 09/468,234 entitled "ROLL OVER STABILITY CONTROL FOR AN AUTOMOTIVE VEHICLE" filed on Dec. 21, 1999 now U.S. Pat. No. 6,263,261.

BACKGROUND OF INVENTION

1. Technical Field

The present invention relates generally to a dynamic behavior control apparatus for an automotive vehicle, and more specifically, to a method and apparatus for controlling the roll characteristics of the vehicle by controlling the steering direction of the vehicle.

2. Background

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the roll over characteristic of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the vehicle body on a plane or nearly on a plane parallel to the road surface. Roll over control is maintaining the vehicle wheels on the road surface. One system of tilt control is described in U.S. Pat. No. 5,869,943. The "943 patent uses the combination of yaw control and tilt control to maintain the vehicle body horizontal while turning. The system is used in conjunction with the front outside wheels only. To control tilt, a brake force is applied to the front outside wheels of a turn. In certain maneuvers, however, application of brakes may not be desirable. It would therefore be desirable to provide a roll stability system that detects a potential rollover condition and temporarily applies steering in a desired direction to counter rollover.

SUMMARY OF INVENTION

It is therefore an object of the invention to provide a roll control system for use in a vehicle using steering direction.

In one aspect of the invention, stability control system for an automotive vehicle includes a plurality of sensors sensing the dynamic conditions of the vehicle and a controller that controls direction to reduce a tire moment so the net moment of the vehicle is counter to the roll direction. The sensors may include a speed sensor, a lateral acceleration sensor, a longitudinal acceleration sensor, a roll rate sensor, and a yaw rate sensor. A controller is coupled to the sensors to determine a roll angle estimate. The controller determines the direction and steering effort change in response to the relative roll angle estimate to counter roll.

In a further aspect of the invention, a method of controlling roll stability of the vehicle comprises the steps of:

determining a roll angle estimate in response to a rollover sensor; and controlling at least one of the front steering actuators to determining a tire force vector in response to the relative roll angle estimate.

One advantage of the invention is that such systems may be easily implemented into a steer-by-wire system.

Other objects and features of the present invention will become apparent when viewed in light of the detailed description of the preferred embodiment when taken in conjunction with the attached drawings and appended claims.

BRIEF DESCRIPTION OF DRAWINGS

FIG. 3 is a block diagram of a roll stability system according to the present invention.

FIG. 4 is a flow chart of a yaw rate determination according to the present invention.

FIG. 5 is a flow chart of roll rate determination according to the present invention.

FIG. 6 is a flow chart of a lateral acceleration determination according to the present invention.

DETAILED DESCRIPTION

Figure 1:
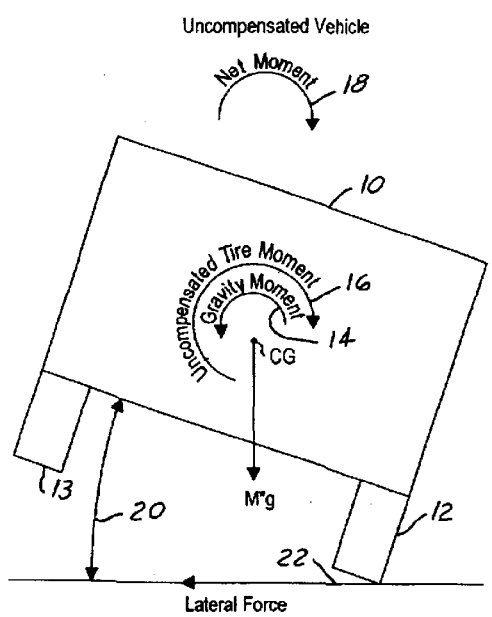
FIG. 1 is a diagrammatic rear view of a vehicle with force vectors not having a roll stability system according to the present invention.

Referring to FIG. 1, an automotive vehicle 10 without a rollover stability system of the present invention is illustrated with the various forces and moments thereon during a rollover condition. Vehicle 10 has right and left tires 12 and 13 respectively. The vehicle may also have a number of different types of steering configurations including having each of the front and rear wheels configured with an independently controllable actuator, the front and rear wheels having a conventional type system in which both of the front wheels are controlled together and both of the rear wheels are controlled together, a system having conventional front steering and independently controllable rear steering for each of the wheels or vice versa. Variation of a control system for each will be described below. Generally, the vehicle has a weight represented as M*g at the center of gravity of the vehicle. A gravity moment 14 acts about the center of gravity (CG) in a counter-clockwise direction. A tire moment 16 acts in a clockwise direction about the center of gravity. Thus, the net moment 18 acting upon the vehicle is in a clockwise direction and thus increases the roll angle 20 of the vehicle. The lateral force 22 at the tire 12 on the ground (tire vector) is a significant force to the left of the diagram capable of overturning the vehicle when left uncorrected.

Figure 2:
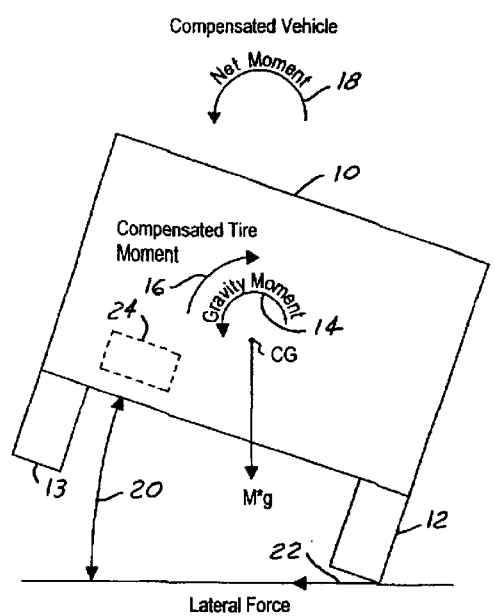
FIG. 2 is a diagrammatic rear view of a vehicle with force vectors having a roll stability system according to the present invention.

Referring now to FIG. 2, a roll stability control system 24 is included within vehicle 10, which is in a roll condition. The forces illustrated in FIG. 2 are given the same reference numerals as the forces and moments in FIG. 1. In FIG. 2, however, roll stability controller 24 reduces the tire moment 16 to provide a net moment 18 in a counter-clockwise direction. Thus, the tire vector or lateral force 22 at tire 12 is reduced as well. This tendency allows the vehicle to tend toward the horizontal and thus reduce angle 20.

Referring now to FIG. 3, roll stability control system 24 has a controller 26 used for receiving information from a number of sensors which may include a yaw rate sensor 28, a speed sensor 30, a lateral acceleration sensor 32, a roll rate sensor 34, a steering angle sensor 35, a longitudinal acceleration sensor 36, a pitch rate sensor 37 steer. Lateral acceleration, longitudinal acceleration, yaw rate, roll orientation and speed may be obtained using a global positioning system (GPS). Based upon inputs from the sensors, controller 26 controls a tire force vector by steering control 38 as will be further described below or changing the steering angle. Depending on the desired sensitivity of the system and various other factors, not all the sensors 28–37 may be used in a commercial embodiment.

Roll rate sensor 34 and pitch rate sensor 37 may sense the roll condition of the vehicle based on sensing the height of one or more points on the vehicle relative to the road surface. Sensors that may be used to achieve this include a lidar or radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an active suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an opticalbased speed sensor.

Steering control 38 may control the position of the front right wheel actuator 40A, the front left wheel actuator 40B, the rear left wheel actuator 40C, and the right rear wheel actuator 40D. Although as described above, two or more of the actuators may be simultaneously controlled. For example, in a rack-and-pinion system, the two wheels coupled thereto are simultaneously controlled. Based on the inputs from sensors 28 through 39, controller 26 determines a roll condition and controls the steering position of the wheels. Controller 26 may also use brake control 42 coupled to front right brakes 44A, front left brakes 44B, rear left brakes 44C, and right rear brakes 44D. By using brakes in addition to steering control some control benefits may be achieved. That is, controller 26 may be used to apply a brake force distribution to the brake actuators in a manner described in U.S. Pat. No. 6,263,261 which is hereby incorporated by reference.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity (V_CG). Various other algorithms are known to those skilled in the art. Speed may also be obtained from a transmission sensor. For example, if speed is determined while speeding up or braking around a corner, the lowest or highest wheel speed may be not used because of its error. Also, a transmission sensor may be used to determine vehicle speed.

Referring now to FIG. 4, The yaw rate sensor 28 generates a raw yaw rate signal (YR_Raw). A yaw rate compensated and filtered signal (YR_CompFlt) is determined. The velocity of the vehicle at center of gravity (V_CG), the yaw rate offset (YR_Offset) and the raw yaw rate signal from the yaw rate sensor (YR_Raw) are used in a yaw rate offset initialization block 45 to determine an initial yaw rate offset. Because this is an iterative process, the yaw rate offset from the previous calculation is used by yaw rate offset initialization block 45. If the vehicle is not moving as during startup, the yaw rate offset signal is that value which results in a compensated yaw rate of zero. This yaw rate offset signal helps provide an accurate reading. For example, if the vehicle is at rest, the yaw rate signal should be zero. However, if the vehicle is reading a yaw rate value then that yaw rate value is used as the yaw rate offset. The yaw rate offset signal along with the raw yaw rate signal is used in the anti-windup logic block 46. The anti-windup logic block 46 is used to cancel drift in the yaw rate signal. The yaw rate signal may have drift over time due to temperature or other environmental factors. The anti-windup logic block also helps compensate for when the vehicle is traveling constantly in a turn for a relatively long period. The anti-windup logic block 46 generates either a positive compensation OK signal (Pos Comp OK) or a negative compensation OK signal (Neg Comp OK). Positive and negative in this manner have been arbitrarily chosen to be the right and left direction with respect to the forward direction of the vehicle, respectively. The positive compensation OK signal, the negative compensation OK signal and the yaw rate offset signal are inputs to yaw rate offset compensation logic block 47.

The yaw rate offset compensation logic block 47 is used to take data over a long period of time. The data over time should have an average yaw of zero. This calculation may be done over a number of minutes. A yaw rate offset signal is generated by yaw rate offset compensation logic 47. A summing block 48 sums the raw yaw rate signal and the yaw rate offset signal to obtain a yaw rate compensated signal (YR_Comp).

A low pass filter 49 is used to filter the yaw rate compensated signal for noise. A suitable cutoff frequency for low pass filter 49 is 20 Hz.

Referring now to FIG. 5, a roll rate compensated and filtered signal (RR_CompFlt). The roll rate compensated and filtered signal is generated in a similar manner to that described above with respect to yaw rate. A roll rate offset initialization block 50 receives the velocity at center of gravity signal and a roll rate offset signal. The roll rate offset signal is generated from a previous iteration. Like the yaw rate, when the vehicle is at rest such as during startup, the roll rate offset is chosen so that the roll rate signal is zero.

A roll rate offset compensation logic block 52 receives the initialized roll rate offset signal. The roll rate offset compensation logic generates a roll rate offset signal which is combined with the roll rate raw signal obtained from the roll rate sensor in a summing block 54. A roll rate compensated signal (RR_Comp) is generated. The roll rate compensated signal is filtered in low pass filter 56 to obtain the roll rate compensated and filtered signal that will be used in later calculations.

Referring now to FIG. 6, the raw lateral acceleration signal (Lat Acc Raw) is obtained from lateral acceleration sensor 32. The raw lateral acceleration signal is filtered by a low pass filter to obtain the filtered lateral acceleration signal (Lat Acc Flt). The filter, for example, may be a 20 Hz low pass filter.

Figure 7:
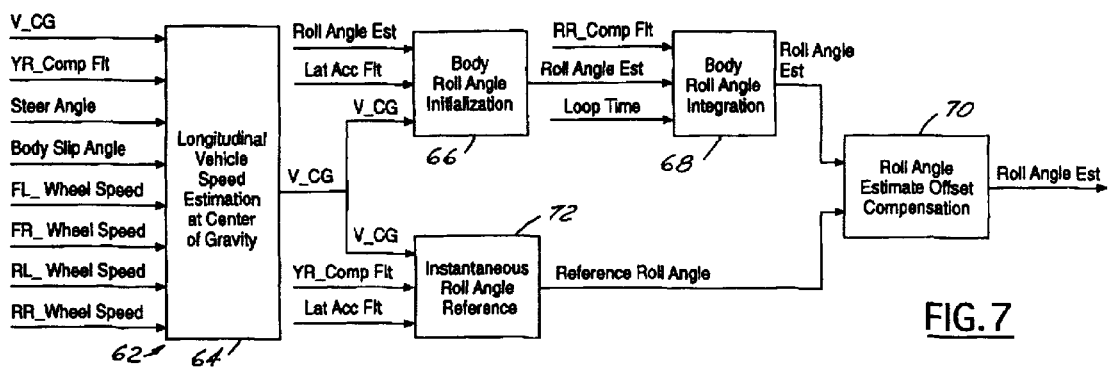
FIG. 7 is a flow chart of chassis roll angle estimation and compensation.

Referring now to FIG. 7, a roll angle estimation signal (RollAngleEst) is determined by chassis roll estimation and compensation procedure 62. Block 64 is used to obtain a longitudinal vehicle speed estimation at the center of gravity of the vehicle. Various signals are used to determine the longitudinal vehicle speed at the center of gravity including the velocity of the vehicle at center of gravity determined in a previous loop, the compensated and filtered yaw rate signal determined in FIG. 4, the steering angle, the body slip angle, the front left wheel speed, the front right wheel speed, the rear left wheel speed, and the rear right wheel speed.

The new velocity of the center of gravity of the vehicle is an input to body roll angle initialization block 66. Other inputs to body roll angle initialization block 66 include roll angle estimate from the previous loop and a filtered lateral acceleration signal derived in FIG. 6. An updated roll angle estimate is obtained from body roll angle initialization. The updated roll angle estimate, the compensated and filtered roll rate determination from FIG. 5, and the time of the loop is used in body roll angle integration block 68. The updated roll angle estimate is equal to the loop time multiplied by the compensated and filtered roll rate which is added to the previous roll angle estimate obtained in block 66. The updated roll angle estimate is an input to roll angle estimate offset compensation block 70.

The velocity at the center of gravity of the vehicle is also an input to instantaneous roll angle reference block 72. Other inputs to instantaneous roll angle reference block 72 include the compensated and filtered yaw rate from FIG. 4 and the filtered lateral acceleration signal from FIG. 6. The following formula is used to determine a reference roll angle:

Reference Roll Angle=ARCSin[1/g(VCG*YRCompFlt-LatAccFlt)]

Where g is the gravitational constant 9.81 m/s²

The reference roll angle from block 72 is also an input to roll angle estimate offset compensation. The updated roll angle estimation is given by the formula:

$$RollAngleEst = RollAngleEst(\text{from Blcok } 68) + $$
$$ReferenceRollAngle - RollAngleEst \text{ Block } 68 \; \frac{looptime}{Tau}$$

Where Tau is a time constant and may be a function of steering velocity, LatAcc and V-CG. A suitable time constant may, for example, be between 1 and 30 seconds depending on the vehicle condition.

Figure 8:
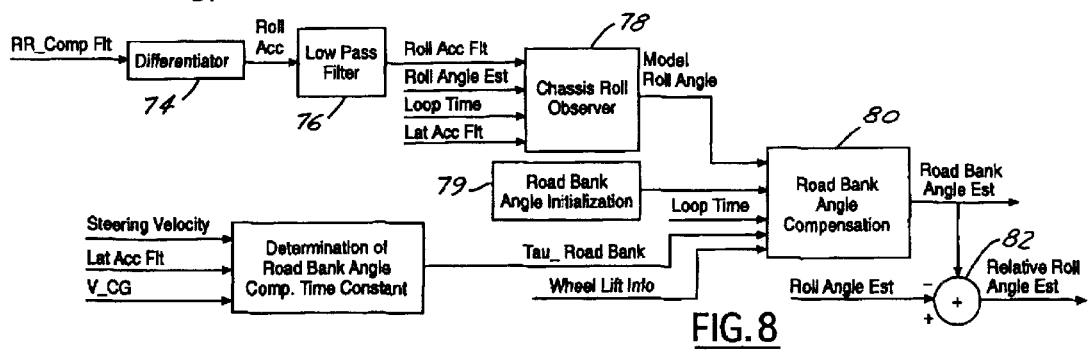
FIG. 8 is a flow chart of a relative roll calculation.

Referring now to FIG. 8, a relative roll angle estimation (RelativeRollAngleEst) and a road bank angle estimate signal is determined. The first step of the relative roll angle calculation involves the determination of road bank angle compensation time constant (Tau) block 72. The velocity at the center of gravity, the steering velocity and the filtered lateral acceleration signal from FIG. 6 are used as inputs. A compensated and filtered roll rate (RR_CompFlt) is used as an input to a differentiator 74 to determine the roll acceleration (Roll Acc). Differentiator 74 takes the difference between the compensated and filtered roll rate signal from the previous loop and the compensated and filtered roll rate from the current loop divided by the loop time to attain the roll acceleration. The roll acceleration signal is coupled to a low pass filter 76. The filtered roll acceleration signal (Roll Acc Flt), roll angle estimate, the filtered lateral acceleration signal and the loop time are coupled to chassis relative roll observer block 78. The chassis roll observer 78 determines the model roll angle estimation (Model Roll Angle Est). The model roll angle is a stable estimation of the roll dynamics of the vehicle which allows the estimates to converge to a stable condition over time.

From the model roll angle estimation from block 78, the initial relative roll angle estimation from block 72, a road bank angle initialization from a block 79 loop time and a roll angle estimate, road bank angle compensation block 80 determines a new road bank angle estimate. The formula for road bank angle is:

$$RoadBankAngleEst = $$
$$\frac{LoopTime}{TauRoad\_Bank} * \left( RollAngleEst - \left( \begin{array}{c} ModelRollAngle + \\ RoadBankAngleEst \end{array} \right) \right)$$

The roll angle estimate may be summed with the road bank angle estimate from block 80 in summer 82 to obtain a relative roll angle estimate. The road bank angle estimate may be used by other dynamic control systems.

Figure 9:
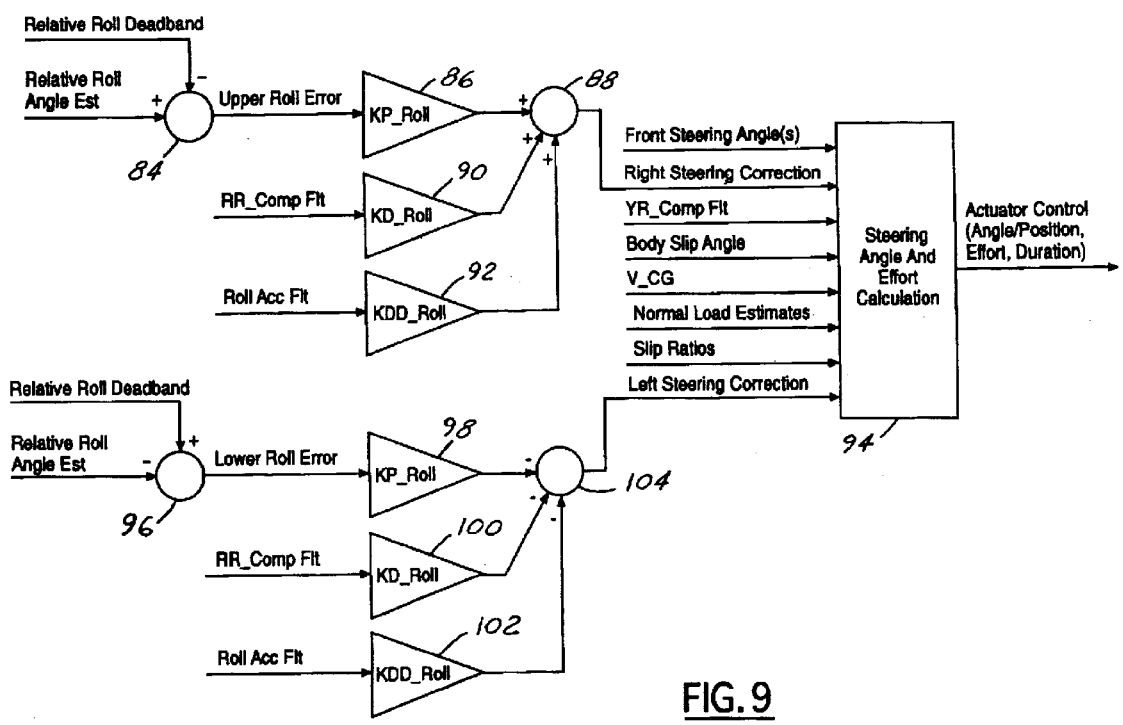
FIG. 9 is a flow chart of system feedback for the vehicle resulting in a change in steering effort.

Referring now to FIG. 9, the relative roll angle estimate from FIG. 8 and a relative roll deadband are summed in summer 84 to obtain an upper roll error. The upper roll error is amplified in KP_Roll Amplifier 86 and is coupled to summer 88. The roll rate compensated and filtered signal from FIG. 5 is coupled to KD_Roll Amplifier 90. The amplified roll rate signal is coupled to summer 88. The filtered roll acceleration signal from block 8 is coupled to KDD_Roll Amplifier 82. The amplified signal is also coupled to summer 88.

The proportioned sum of the amplified signals is the right side steering tire correction. The steering actuator control signals are calculated from the tire corrections, the front steer angle(s) (or the steering actuator positions), the vehicle side slip angle, the vehicle yaw rate and vehicle speed. Increased accuracy and robustness can be achieved by including tire normal load estimates and/or tire slip ratios. In the steering angle and effort correction block 94, the tire slip angles are calculated and used to determine the corrections to the front steer angles that will reduce the tire lateral forces and reduce the vehicle roll angle. Block 94 also calculates the actuator control signals necessary to achieve the desired tire steering corrections.

The measured steering actuator positions are inputs to block 94. The change in the actuator direction and effort amounts and duration are outputs of block 94. The block 94 determines the appropriate direction and force amount to apply to the steering actuators to prevent roll.

The output of block 94 is used by the steering controller 38 of FIG. 3 to apply the desired steering to the front and/or rear wheels depending on the type of steering system. The steering controller factors in inputs such as the current steering position and the dynamics of the vehicle. Other inputs may include inputs from other dynamic control systems such as a yaw control system. In a production ready embodiment, the vehicle design characteristics will be factored into the desired control based on the sensor outputs.

The bottom portion of FIG. 9 is similar to the top, however, the signs are changed to reflect that the left side of the vehicle is a negative side of the vehicle. Therefore, relative roll angle estimate and relative roll deadband are purely summed together 96 in summing block 96 to obtain the lower roll error. The lower roll error is passed through KP_Roll amplifier 98. The compensated and filtered roll rate is passed through KDD_Roll amplifier 100 and the filtered roll acceleration signal is passed through KDD_Roll amplifier 102. The inverse of the signals from amplifiers 98, 100 and 102 are input and summed in summer 104 to obtain the desired left actuator control.

By properly applying a desired steering control to the vehicle, the tire moment is reduced and the net moment of the vehicle is counter to a roll direction to reduce the roll angle and maintain the vehicle in a horizontal plane.

In operation, various types of steering control may be performed depending on the vehicle characteristics and the steering system. For example, as described above a rack system may be controlled to provide a desired change in the rear steering angle temporarily to prevent rollover while leaving the front wheels unchanged. Of course, the direction of the front wheels could also be change when the rear direction is changed.

In a system having independently actuable front wheels, the relative steering angle between the front wheels may be changed in response to detected roll by steering control 38 without changing the position or controlling the position of the rear wheel. This may be done by independent control of the front wheels or simultaneous control of the front wheels.

In a system having independently actuable rear wheels, the relative steering angle between the front wheels may be changed in response to detected roll by steering control 38 without changing the position or controlling the position of the front wheels. This may be done by independent control of the rear wheels or simultaneous control of the rear wheels.

As described above the longitudinal acceleration sensor and a pitch rate sensor may be incorporated into the above tire force vector determination. These sensors may be used as a verification as well as an integral part of the calculations. For example, the pitch rate or the longitudinal acceleration or both can be used to construct a vehicle pitch angle estimate.

This estimate along with its derivative can be used to improve the calculation of the vehicle roll angle. An example of how the rate of change of the vehicle roll angle using theses variables may be constructed is:

$$\text{GlobalRR} \approx \text{RRComp\_Flt} + \text{PitchRateCompFlt}(-\text{YawRate} + \text{Sin}(\text{GlobalRollAngleEst}) * \text{Tan}(\text{VehiclePitchAngleEst})) + (\text{YawRateCompFlt} * \text{Cos}(\text{GlobalRR}) * \text{Tan}(\text{PitchAngleEst}))$$

Where PitchRateCompFlt is a compensated and filtered pitch rate signal, GlobalRollAngleEst is an estimated global roll angle, VehiclePitchAngleEst is an estimated vehicle pitch angle estimate, and GlobalRR is a global roll rate signal. Of course, those skilled in the art may vary the above based upon various other factors depending on the particular system needs.

While particular embodiments of the invention have been shown and described, numerous variations and alternate embodiments will occur to those skilled in the art. Accordingly, it is intended that the invention be limited only in terms of the appended claims.

What is claimed is:

1. A stability control system for an automotive vehicle having a front steering system comprising:

a front right wheel actuator; and a front left wheel actuator;

a front right wheel position sensor generating a front right position signal and a front left wheel position sensor generating a front left wheel position signal;

a rollover sensor for producing a rollover signal in response to an impending rollover of the vehicle; and a controller coupled to said front right wheel position sensor, said front left wheel position sensor, said rollover sensor, said front right wheel actuator and said front left wheel actuator, said controller generating a front right wheel actuator signal and a front left wheel actuator signal in response to said rollover signal, said front right wheel actuator signal and said front left wheel actuator signal controlling said respective front left and front right steering actuator to prevent the vehicle from rolling over.

2. A stability control system as recited in claim 1 wherein said rollover sensor comprises one or more selected from the group of a lateral acceleration sensor, a roll rate sensor, and a load sensor.

3. A stability control system as recited in claim 2 further comprising a sensor selected from the group of a steering angle sensor, a speed sensor, a yaw rate sensor, a longitudinal acceleration sensor and a pitch rate sensor.

4. A stability control system as recited in claim 1 wherein said controller changes a tire force vector by changing a direction and front steering force of said front right actuator.

5. A stability control system as recited in claim 1 wherein said controller changes a tire force vector by changing a direction and front steering force of said front left actuator.

6. A stability control system as recited in claim 1 wherein said controller changes a tire force vector by changing a relative direction between said right front actuator and said left front actuator.

7. A stability control system as recited in claim 1 further comprising a plurality of brake actuators, said controller controlling said brake actuators in response to said rollover signal.

8. A stability control system as recited in claim 1 further comprising a rear wheel steering actuator, said controller controlling said rear wheel steering actuator in response to said rollover signal.

* * * * *